UNITED STATES PATENT OFFICE.

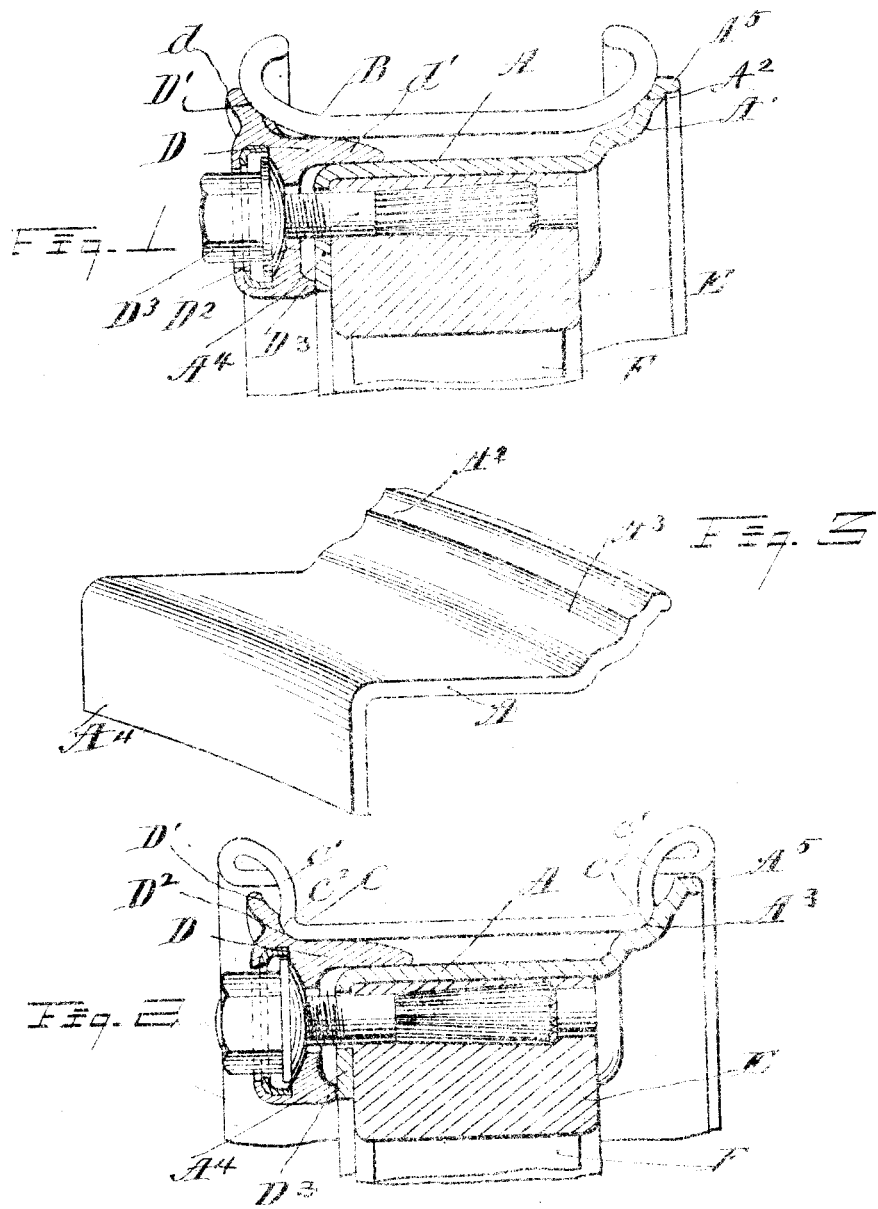

JOHN KELSEY, OF DETROIT, MICHIGAN.

FELLY-BAND.

1,139,772.　　　Specification of Letters Patent.　　Patented May 18, 1915.

Application filed August 29, 1914.　Serial No. 859,257.

*To all whom it may concern:*

Be it known that I, JOHN KELSEY, a citizen of the United States, and resident of Detroit, in the county of Wayne and State of Michigan, have invented certain new and useful Improvements in Felly-Bands, of which I hereby declare the following to be a full, clear, and exact description, such as will enable others skilled in the art to which it appertains to make and use the same.

The objects of the invention are to provide a form of felly band which will permit of seating two well known forms of detachable tire holding rims interchangeable thereon. These rims are known commercially as the "clencher" and the "straight side" rims, respectively. The clencher rim is provided with inwardly curved marginal flanges to secure the edges of a clencher tire and the straight side rim is provided with substantially straight flanges which are outwardly curved at their outer edges. To adapt the felly band for use interchangeably with these rims it is provided with a flange upon its inner edge upon which are positioned two annular recesses which serve independently as seats for the inner edges of the respective rims, one seat being spaced from the other to accommodate it to difference in width of the respective rims. The outer edges of the rims are held in place and properly spaced from the felly band by means of a series of spaced clamps which are each provided with two annular seats corresponding to the two seats upon the rim of the felly band. By these means there will be no difficulty in removing a clencher rim and tire attached thereto and substituting a straight side rim therefor, and tire or vice versa.

The invention is hereinafter further described and illustrated in the accompanying drawings and specifically pointed out in the claims.

In the accompanying drawings Figure 1 is a transverse section of a felly band showing a clencher rim attached thereto; Fig. 2 as a similar section showing a straight side rim attached thereto; Fig. 3 is a perspective view of a portion of the rim which is shown as a split rim, one end of the rim being shown.

In these views A is the felly band, B is the clencher rim and C is the straight side rim.

D, D, are the clamps which secure the rims in place upon the felly band.

E is the felly of the wheel and F, F, are the spokes.

A′ is an inclined flange upon the inner edge of the felly band which is provided with an annular curved recess $A^2$ that serves as a seat or abutment for the inner edge of the clencher rim B. This edge is curved to make contact with the surface of the annular seat so that there will be no lost motion of any kind in the rim. The outer edge of the rim is similarly curved so as to make contact with a similar recess D′ in each of the clamps D which attach the rim to the felly band and are adjustably secured by means of bolts $D^2$ and nuts $D^3$ thereon.

The seat D′ is formed in a flange $d$ upon each clamp and an inwardly extended flange $d'$ serves to space the rim and felly band apart. The seat D′ is formed at a corresponding distance from the center of the wheel as the seat $A^2$ and between the two seats the rim is rigidly supported when the parts are assembled.

In Fig. 3 the rim C is shown to be provided with straight side flanges C′, C′ and they join the rim with curved edges at $C^2$, $C^2$. The flange A′ of the felly band is provided with a second annular recess $A^3$ positioned nearer to the band and nearer to the center of the wheel than the recess $A^2$, and in this recess rests one of the edges $C^2$ of the rim C which forms the seat or abutment therefor. The outer edge of the rim C is engaged and held in place by the clamps D, D, and a corresponding recess $D^2$ is formed therein at a corresponding distance from the center of the wheel and spaced inwardly from the recess D′ in the flange $d'$.

In Fig. 3 the shape of the felly band is clearly seen and also a flange $A^4$ thereon which extends toward the center of the wheel. Against this flange the heels $D^5$, $D^5$ of the clamps rest and upon which they have a rocking movement and the nut upon each bolt is provided with a rounded inner face which will permit a corresponding surface of the clamp to rock thereon. At $A^5$ the flange A′ of the felly band terminates in a lateral extension which reinforces the edge and also serves to prevent the overturned edge of the straight side rim from becoming permanently deflected if struck forcibly by any hard object.

By means of this construction it is possible to use either the clencher or straight side rim with the one felly band, also the two rims are each reversible as well as interchangeable.

Having described the invention what I claim as new and desire to secure by Letters Patent is:

1. As an article of manufacture, a sheet metal felly band for a wheel, said band having an inclined flange upon its inner edge, said flange provided with two spaced annular rim seats or abutments thereon, said abutments positioned at different distances from the axis of said wheel.

2. The combination with a felly band, of a flange upon one edge thereof, and annular rim seats upon said flange, said rim seats spaced from each other and from the axis of the wheel.

3. The combination with the felly and felly band of a wheel, of a flange upon said felly band, said flange having spaced annular rim seats thereon for clencher and straight side rims respectively, bolts passing through said felly, and clamps thereon, said clamps having each a flange, and each flange having corresponding spaced seats thereon for clencher and straight side rims respectively.

4. The combination with a wheel felly, of a felly band therefor having an outwardly inclined inner flange thereon and annular seats respectively for clencher and straight side rims, the outer edge of said flange being laterally extended, substantially as and for the purpose set forth.

5. The combination with a felly band, of a flange upon the outer edge thereof, extending toward the axis thereof, an inclined flange upon the inner edge of said felly band and independent annular seats for clencher and straight side rims respectively spaced apart in said inner flange and clamps for securing said rims to said felly band, each clamp provided with corresponding independent seats for said respective rims.

In testimony whereof, I hereunto set my hand this 15" day of August, 1914.

JOHN KELSEY.

In presence of—
  L. C. BROOKS,
  L. H. McCRACKEN.